United States Patent [19]
Vilbert

[11] Patent Number: 5,597,094
[45] Date of Patent: Jan. 28, 1997

[54] DEVICE WITH PERISTALTIC PUMP WHICH MAKES IT POSSIBLE TO DRAW, WEIGHT AND MIX LIQUIDS AUTOMATICALLY

[75] Inventor: Bernard Vilbert, Carnon, France

[73] Assignee: Solignac Industries S.A., France

[21] Appl. No.: 501,430

[22] Filed: Jul. 12, 1995

Related U.S. Application Data

[63] Continuation of Ser. No. 384,625, Feb. 6, 1995, abandoned, which is a continuation of Ser. No. 985,836, Dec. 3, 1992, abandoned.

[51] Int. Cl.$^6$ .................................................. B65D 37/00
[52] U.S. Cl. .......................... 222/214; 222/77; 417/477.3; 417/477.6
[58] Field of Search ................................. 222/63, 77, 206, 222/207, 214; 417/474–477.6; 418/45; 604/153

[56] References Cited

U.S. PATENT DOCUMENTS

| | | | |
|---|---|---|---|
| 2,695,117 | 11/1954 | Daniels | 417/477 X |
| 3,011,684 | 12/1961 | Corneil | 222/214 |
| 3,249,059 | 5/1966 | Renn | 417/477 |
| 3,990,444 | 11/1976 | Vial | 604/153 X |
| 4,155,362 | 5/1979 | Jess | 604/153 X |
| 4,513,885 | 4/1985 | Hogan | 222/214 X |
| 4,540,351 | 9/1985 | Olson | 604/153 X |
| 4,552,516 | 11/1985 | Stanley | 417/477.11 |
| 4,648,430 | 3/1987 | Di Gianfilipp et al. | 141/83 X |
| 4,735,558 | 4/1988 | Kienholz et al. | 417/477 |
| 4,995,432 | 2/1991 | Tervamaki et al. | 141/130 |
| 5,044,902 | 9/1991 | Malbec | 604/153 X |
| 5,096,393 | 3/1992 | Van Steenderen et al. | 604/153 X |
| 5,148,841 | 9/1992 | Graffin | 222/77 X |

FOREIGN PATENT DOCUMENTS

| | | | |
|---|---|---|---|
| 1225972 | 8/1987 | Canada | 222/214 |
| 0173846 | 3/1986 | European Pat. Off. | |
| 2655092 | 5/1991 | France | |
| 2133775 | 8/1984 | United Kingdom | |
| 2151800 | 7/1985 | United Kingdom | |

OTHER PUBLICATIONS

English translation of French Patent No. 2,655,092.

*Primary Examiner*—Kevin P. Shaver
*Attorney, Agent, or Firm*—Lerner, David, Littenberg, Krumholz & Mentlik

[57] ABSTRACT

A modular peristaltic pump assembly that will automatically draw, weigh and mix various expensive liquids arranged in bottles contains multiple pumping units or modules driven by a two-part peristaltic pump, the first part being a pump body intended to receive a squeezable hose and the second part being a rotor driven by a motor integral with a mobile unit to which is also joined a recipient device holding a recipient bottle intended to receive liquids drawn off successfully. Each pumping unit is open on its top to receive the rotor. The recipient device incorporates a weighing device making it possible to control the quantity of liquid introduced into the recipient bottle.

10 Claims, 4 Drawing Sheets

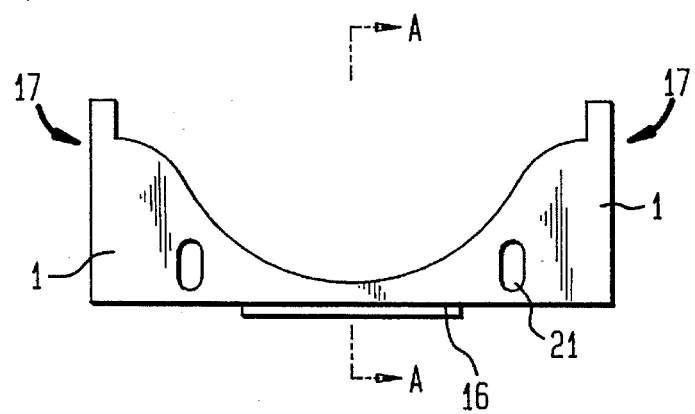
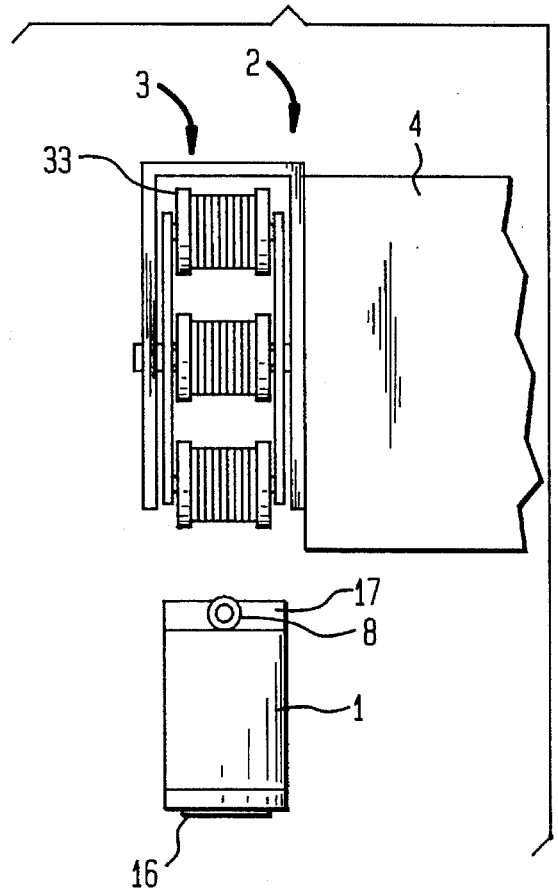
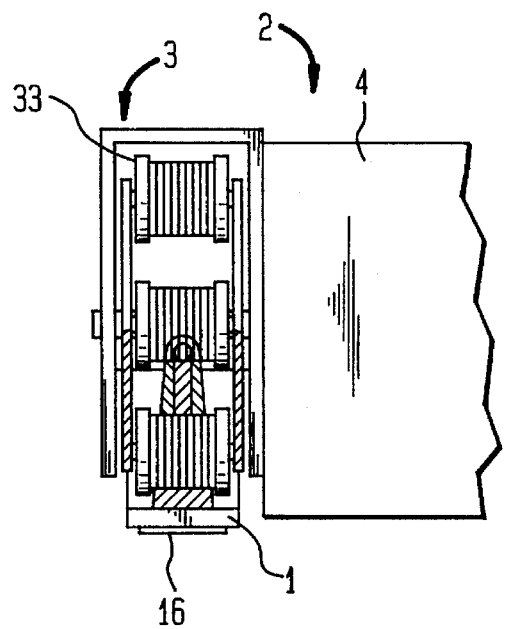

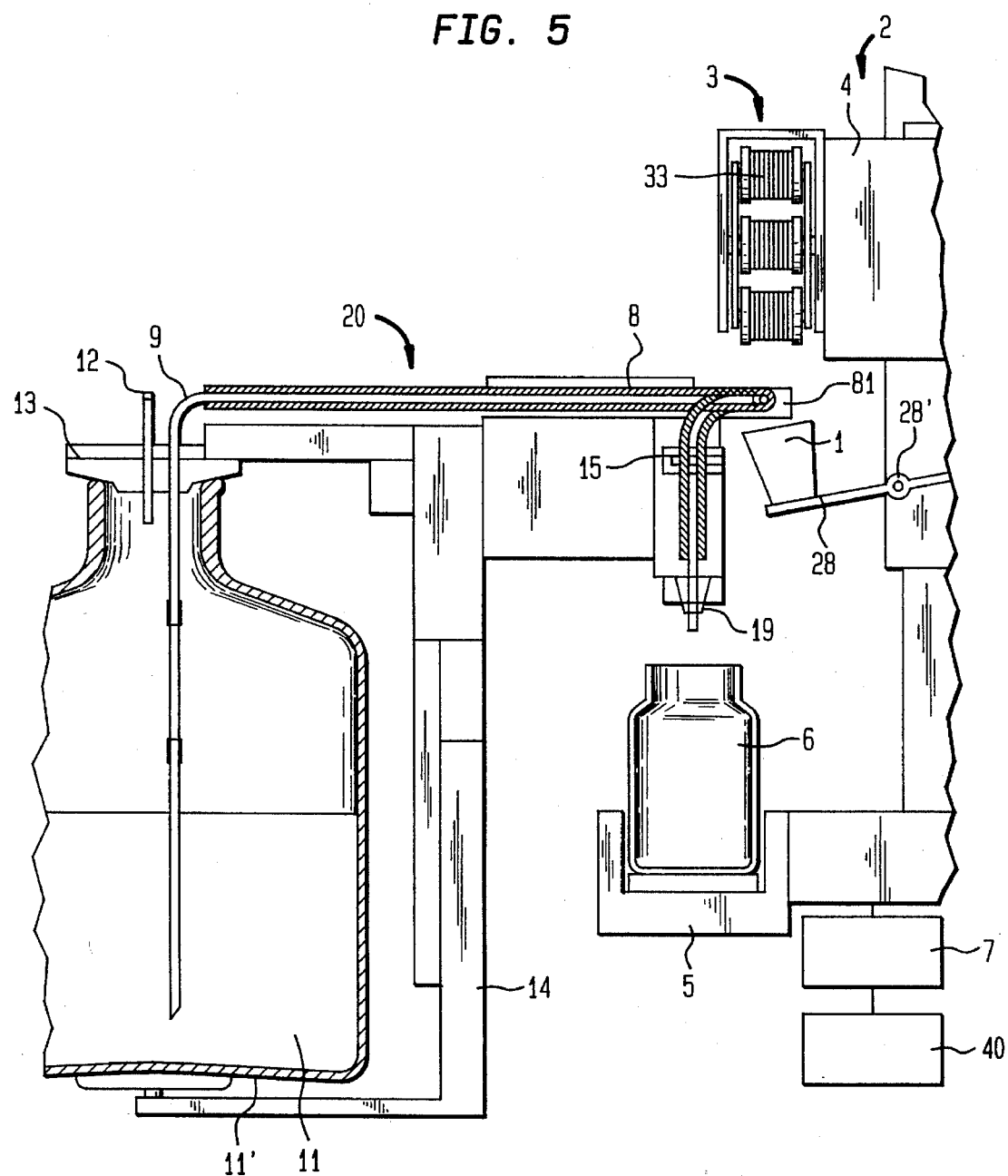

5,597,094

DEVICE WITH PERISTALTIC PUMP WHICH MAKES IT POSSIBLE TO DRAW, WEIGHT AND MIX LIQUIDS AUTOMATICALLY

This is a continuation of application Ser. No. 08/384,625 filed Feb. 6, 1995, now abandoned, which is a continuation of application Ser. No. 07/985,836 filed Dec. 3, 1992, now abandoned.

FIELD OF THE INVENTION

The subject of this invention is a device intended to draw, weigh and mix automatically, under the control of a computer, various precious liquids, under very strict conditions of non-contamination and precise dosage by weight.

BACKGROUND OF THE INVENTION

At present, mixing and weighing operations of liquids are typically done manually in laboratories, according to a certain tradition by using precise electronic scales. However, this does not eliminate the risks of errors in dosage and handling of liquids, especially in the field of perfumes and cosmetics as well as in conventional pharmacy and homeopathy, which require extremely precise dosages.

With the device according to the present invention, it is possible to avoid these errors, as well as the risks inherent in the handling of very costly and sometimes corrosive products. In addition, the device according to the present invention guarantees an optimal economization of such products through greater safety and greater precision in handling, as well as high-speed execution and better protection of the health of the personnel, whose contact with the fumes, and specifically ethyl fumes, is reduced.

SUMMARY OF THE INVENTION

The device according to the present invention contains modular elements that are juxtaposable if necessary. Each element or pumping module is provided with a bottle or other container containing the liquid to be decanted into the recipient bottle.

Pursuant to the present invention, each pumping unit or module contains a squeezable hose and is open at its upper side to permit introduction of the rotor driven by the motor.

This arrangement is highly advantageous because it fulfills the need to devise a simple assembly to be maintained and used by unskilled personnel and enables a considerable savings in terms of product and cabling, since a single motor equipped with a rotor is sufficient for as many pumping units as necessary, theoretically with no limitation in terms of number of pumping units.

Also pursuant to the present invention, the rotor implemented contains three to six cylindrical or grooved cylindrical rollers; both types of rollers can be used depending on the capability of the hose to twist or break free.

According to a first embodiment of the device according to the present invention, the body of the peristaltic pump is integral with the pumping unit and is open on the sides to permit easy replacement of the hose.

In this case, the body of the pump is advantageously made in two parts joined together in an elastic manner, to permit adaptation to hoses of different diameters, these diameters generally ranging from 3 to 6 millimeters.

In operation, the assembly comprised of the motor and the roller-bearing rotor is first positioned over the pumping unit designated by the drawing and mixing program. The assembly is then is connected to the pumping unit and hose and turns in the direction of the flow of the liquid until it obtains the desired weight. After the desired weight is reached, the assembly stops and turns in the opposite direction, for example for one or two revolutions, in order to reintroduce into the initial recipient the liquid contained in the hose and thereby protect it from the oxidizing effect of the air. At the end of this operation, the assembly is disconnected and positioned over another pumping unit according to the continuation of the established program.

According to a second embodiment of the device according to the present invention, the body of the peristaltic pump is integral with the mobile assembly, and the pumping unit is open at the bottom to enable insertion of the pump body.

This second embodiment offers the advantage of necessitating the implementation of just one pump body and one rotor for multiple pumping units.

The operation of the second embodiment is the same as the first embodiment described above, except that the assembly formed by the motor and the roller-bearing rotor moves at the same time as the pump body, which is placed under the squeezable hose of the pumping unit while the rotor is placed above it.

In the absence of the roller-bearing rotor, a device or clip will pinch the tube to prevent any untimely flow of the product or intake of air.

The device according to the present invention also includes a device for simultaneous weighing of a conventional nature and is also advantageously connected to the computer that controls the automatic operation of the assembly according to the chosen program.

This invention will be better understood by reading the following description which refers to the attached drawing, which illustrates one non-restrictive method of construction.

BRIEF DESCRIPTION OF THE DRAWINGS

FIG. 2, shows the pump body of the device in FIG. 1 as viewed from the front.

FIG. 3 shows the same pump body of FIG. 2, but viewed in cross-section, according to the AA cross-section line in FIG. 2, in position disconnected from the rotor.

FIG. 4 shows the same pump body viewed in cross-section shown in FIG. 3 but in a position connected to the rotor.

DETAILED DESCRIPTION OF THE PREFERRED EMBODIMENTS

Figure 1:
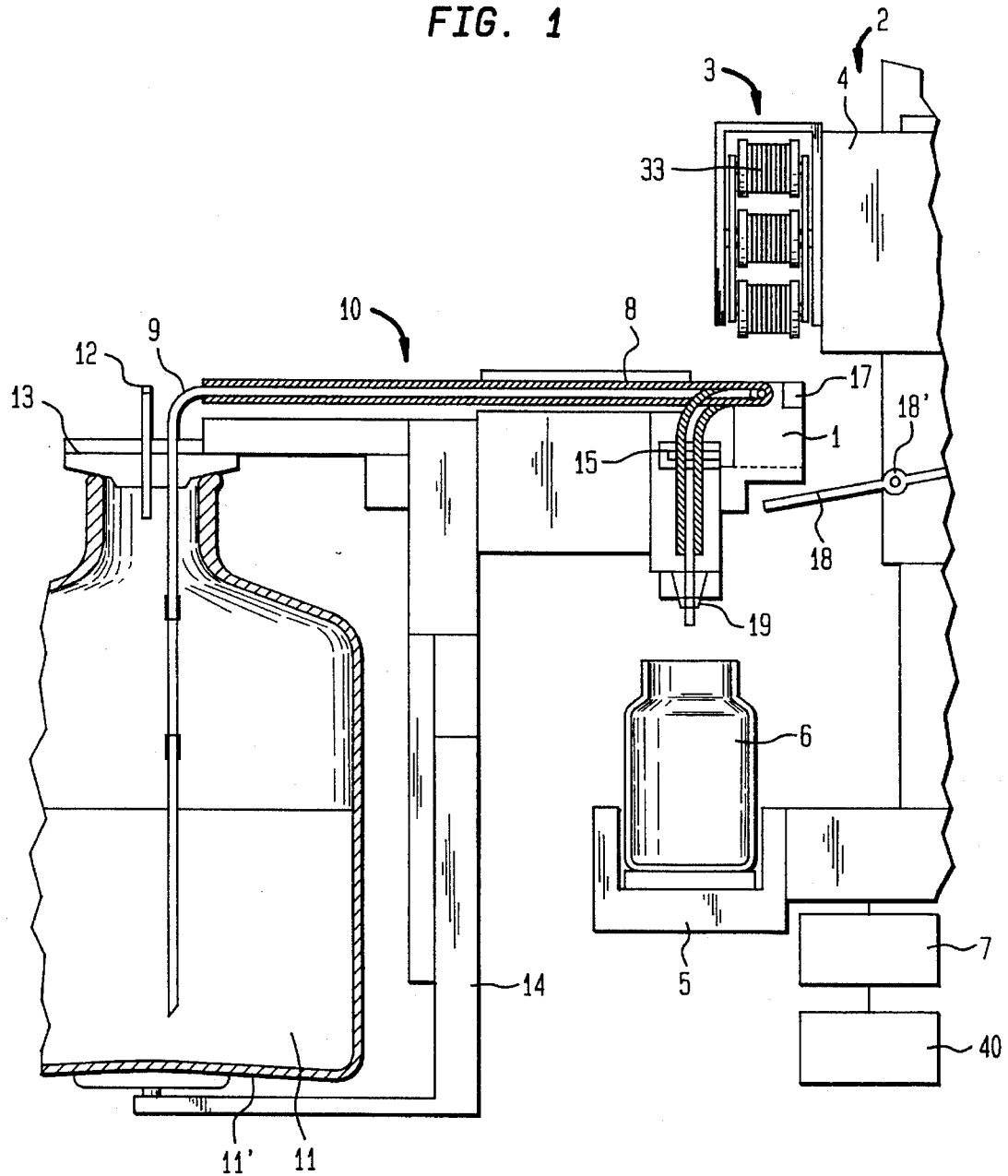
FIG. 1 shows a first embodiment of the device according to the present invention with its roller-bearing rotor in a disconnected position.

Referring to FIG. 1, a pumping unit 10 of the device according to the present invention includes a peristaltic pump body 1 that can be connected to a mobile assembly 2 containing a rotor with rollers 3 equipped with four grooved rollers 33. The rollers 33 are driven in rotation by a motor 4. A recipient device 5 is provided to hold a recipient bottle 6 where the products are mixed. The recipient device 5 incorporates a weighing device 7 with which it is possible to control the quantity of a liquid 11 introduced into the bottle 6 via control means or computer 40.

The pump body 1 is comprised of two parts joined together by a spring plate 16 (visible in FIG. 2) and incorporates a squeezable hose 8 which extends into a lateral part of pump body 1 by a guide 17 and which extends, inside the pump body 1, by a pour nozzle 19 extending into its lower part. The hose 8 is also connected on the outside to a tube 9 which passes through a stopper 13 into a bottle 11 containing the liquid 11 to be drawn off and kept in a bottle carrier 14 incorporating the stopper 13. A short tube 12 passed through the stopper 13 keeps the liquid 11 at ambient pressure, while a clip 15 makes it possible to close the hose 8 after the drawing, the clip 15 being removable mechanically when the rotor 3 is connected to the pump body 1.

A mounted lever 18 is provided and is pivotally connected to mobile assembly 2 about an axis 18. Lever 18 is applied to the base of the pump body 1 during the operation of connecting rotor 3 to pump body 1 to facilitate the approach and positioning of the rotor.

Referring to FIGS. 2, 3 and 4, pump body 1 of the peristaltic pump is made up of two parts joined together by a spring plate 16. Pump body 1 is fixed to the support 14 by means of screws passing through two holes 21 and closing the hose 8 arranged in two circular guides 17.

The hose 8 emerges from the pump body 1 by a guide 17 arranged on the side of the pump body, and the liquid 11 drawn off flows into the recipient bottle 6 through the pour nozzle 19.

The rollers 33 regularly spaced on the rotor 3 make it possible to create a peristaltic movement in the hose 8, thereby permitting the sequential pumping of small quantities of liquid 11 into the bottle 11'; regulation of the motor 4 makes it possible to slow or accelerate the rotation of the rotor 3 and therefore the drawing of the liquid 11.

Referring to FIG. 5, the pump body 1 is integral with the mobile assembly 2 through a mounted articulated arm 28 pivotable about axis 28, while the hose 8 is mounted on a support 81 that can be connected to the mobile assembly 2, and open for this purpose at its upper and lower ends.

In this embodiment, the pumping unit 20 includes the hose 8 mounted on support 81 and the same elements as in the first embodiment shown in FIG. 1 are provided, including bottle 11 containing the liquid 11 to be drawn off, bottle holder 14 equipped with a pierced stopper 13 through which passes a short tube 12, a tube 9 dipping into the liquid 11 and connected to the tube 8. Tube 8 extends into the pumping unit 20 by a pour nozzle 19 under which is positioned the recipient bottle arranged on the recipient device 5 integral with the mobile assembly 2.

Figure 6:
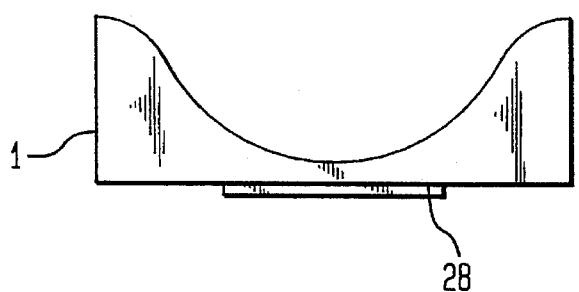
Figure 7:
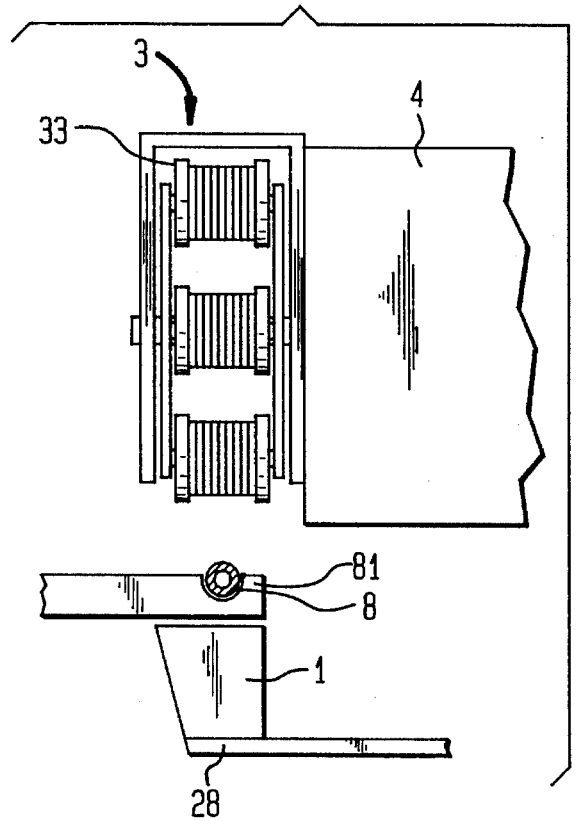
FIG. 7 shows the same pump body of FIG. 5, viewed in cross section, according to the BB cross-section line in FIG. 5, in position disconnected from the rotor.
Figure 8:
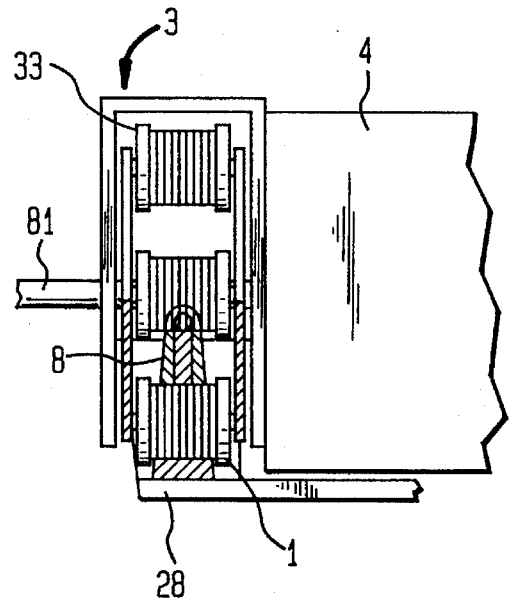
FIG. 8 shows the same pump body, viewed in cross-section, in position connected to the rotor.

Referring to FIGS. 6, 7 and 8, pump body 1 is integral with the articulated arm 28, adapted to introduce hose 8 on support 81 to rotor 3 with its rollers 33, which is integral with the motor 4.

The squeezable hoses of the pumping units of the devices according to the present invention must be chosen to exhibit good resistance to ethanol and certain corrosive liquids and they are preferably made of a flexible plastic material with properties similar to PTFE.

The pump body is preferably made of aluminum alloy for reasons of lightness and rigidity, and for reasons of ease of machining. Certain plastics can also be used provided that they stand up well to the ethyl fumes and solvents contained in the products handled.

The device according to the present invention is particularly suited to the automated mixing of liquids that may be corrosive, with variable quality and viscosity and from various sources, and meets the requirements set forth in precise specifications, specifically with respect to the need to observe strict non-contamination, both by the adjacent products to be handled and by the manufacturing agents contained in the products used.

The device according to the present invention is particularly intended for manufacturers of perfumes and cosmetics, para-pharmacy and the pharmaceutical chemistry but can also be used in the field of food flavoring products and by laboratories that wish to automate their operations.

I claim:

1. A modular peristaltic pump assembly for automatically drawing off measured quantities of a plurality of liquids comprising:

a plurality of juxtaposed pumping modules each comprising a supply of liquid and a squeezable hose;

a mobile assembly readily movable among said plurality of juxtaposed pumping modules, said mobile assembly comprising a recipient container, each said squeezable hose of said pumping modules being in communication with said supply of liquid and said recipient container; and a peristaltic pump for pumping predetermined amounts of liquid from said pumping modules, said pump comprising a pump body integrally connected to each of said pumping modules and horizontally receiving at least a portion of said hose thereon and pressure means for drawing said liquid from said supply of liquid through said hose into said recipient container, said pressure means being movable into operative communication and horizontal engagement with said pump body to exert peristaltic pressure on said hose to draw said liquid from said supply of liquid to said recipient container.

2. A modular peristaltic pump assembly as claimed in claim 1, further comprising control means for controlling the amount of said liquid introduced into said recipient container by controlling the application of said pressure means.

3. A modular peristaltic pump assembly as claimed in claim 2, further comprising weighing means for weighing said liquid introduced into said recipient container, said weighing means being in communication with said control means to control the amount of said liquid introduced into said recipient container.

4. A modular peristaltic pump assembly as claimed in claim 1, wherein said pressure means comprises a rotor assembly actuated by a motor.

5. A modular peristaltic pump assembly as claimed in claim 4, wherein said rotor assembly comprises at least three cylindrical rollers.

6. A modular peristaltic pump assembly as claimed in claim 5, wherein said cylindrical rollers are provided with a grooved surface.

7. A modular peristaltic pump assembly as claimed in claim 1, further comprising closure means to selectively close said hose after said liquid is drawn from said supply into said recipient container to prevent the further introduction of excess liquid into said recipient container and air intake into said hose.

8. A modular peristaltic pump assembly as claimed in claim 7, wherein said closure means comprises a closure clip, said clip being removable when said pumping means is moved into operative communication with said pump body.

9. A modular peristaltic pump assembly as claimed in claim 1, wherein said pump body comprises two portions separable from one another to allow introduction of said hose therebetween, said portions being removably attached together by a spring plate.

10. A modular peristaltic pump assembly, for automatically drawing off measured quantities of a plurality of liquids comprising:

a plurality of juxtaposed pumping modules each comprising a supply of liquid and a squeezable hose;

a mobile assembly readily movable among said plurality of juxtaposed pumping modules, said mobile assembly comprising a recipient container, each said squeezable hose of said pumping modules being in communication with said supply of liquid and said recipient container; and a peristaltic pump for pumping predetermined amounts of liquid from said pumping modules, said pump comprising a pump body integrally connected to said mobile assembly through a pivot arm pivotally mounted to said mobile assembly about an axis, said pumping module further comprising a support member for supporting at least a portion of said hose thereon, said support member having an opening therein to permit said hose to be positioned on said pump body when said pump body is moved into an operative pumping position below said hose via said pivot arm.

* * * * *

UNITED STATES PATENT AND TRADEMARK OFFICE
CERTIFICATE OF CORRECTION

PATENT NO. : 5,597,094
DATED : January 28, 1997
INVENTOR(S) : Bernard Vilbert

It is certified that error appears in the above-identified patent and that said Letters Patent is hereby corrected as shown below:

Title Page, item [54] and in column 1, line 2
In the title "weight" should read — weigh —.

Column 2, line 1, "then is connected" should read — then connected —.

Column 2, line 50 in the Brief Description of the Drawings, insert Figs. 5 and 6 as follows:

Figure 5 shows a second method of constructing the device according to the invention.

Figure 6 shows the pump body of the device in Figure 5, viewed from the front.

Signed and Sealed this

Sixth Day of May, 1997

*Attest:*

*Attesting Officer*

BRUCE LEHMAN
*Commissioner of Patents and Trademarks*